W. PARKES.
CAMERA.
APPLICATION FILED MAR. 22, 1916.
1,336,441. Patented Apr. 13, 1920.
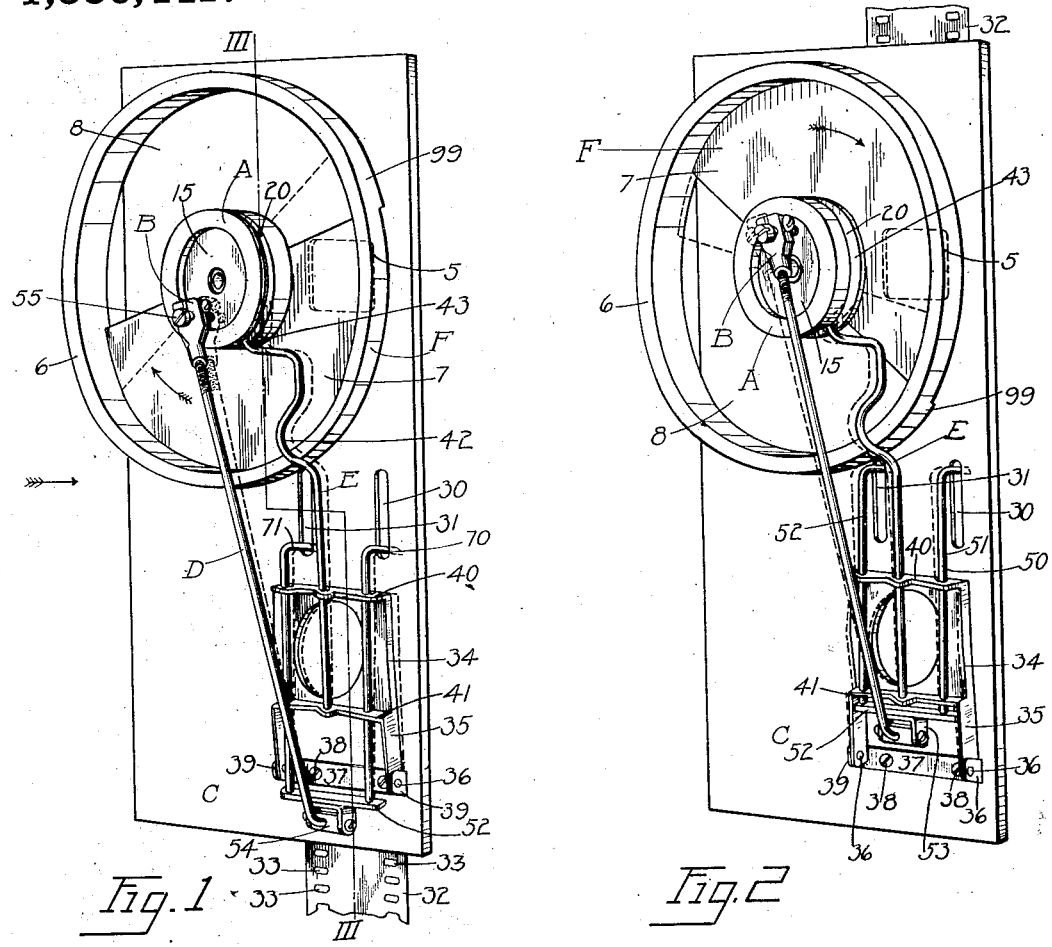
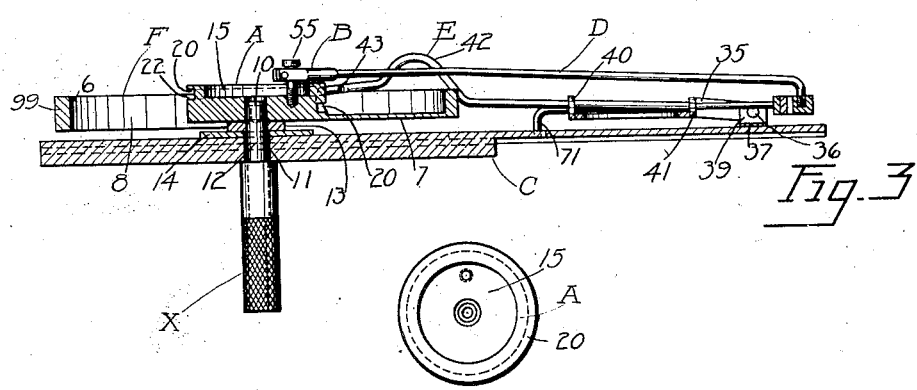
Inventor
Walter Parkes
By H. O. Richey
His Atty.

UNITED STATES PATENT OFFICE.

WALTER PARKES, OF ELYRIA, OHIO, ASSIGNOR TO ARTHUR L. GARFORD, OF ELYRIA, OHIO.

CAMERA.

1,336,441.  Specification of Letters Patent.  Patented Apr. 13, 1920.

Application filed March 22, 1916. Serial No. 85,755.

*To all whom it may concern:*

Be it known that I, WALTER PARKES, a subject of the King of Great Britain, residing at Elyria, in the county of Lorain and State of Ohio, have invented certain new and useful Improvements in Cameras; and I do hereby declare the following to be a full, clear, and exact description of my invention, such as will enable others skilled in the art to which it appertains to make and use the same.

My invention relates to cameras, and more particularly to cameras employed for taking moving pictures. My invention is more particularly directed to the shutter and the means for feeding the film to cameras of this type. It will be understood that the film is moved after each exposure to present for the next exposure a virgin portion of the film, the shutter being open during the exposure and closed during the movement of the film. I aim to provide a device which is cheaper and easier to construct than the devices which have hitherto been used; to simplify the devices not only in construction, but in operation; to consolidate the shutter and the feed mechanism into a unitary structure, and to condense the two devices so that they can be made into a thin structure, especially suitable to be employed in connection with cameras which are to be carried about in the pocket or other small space.

I aim to produce mechanism which can be employed in a camera which takes, prints and projects pictures, and which can be used to take stationary, as well as motion, pictures.

I also aim to produce a device which will be noiseless, or substantially noiseless, in operation.

These and other objects of my invention will perhaps be better understood from a description of an embodiment of the invention.

Figure 1 is a perspective view of an embodiment of my invention shown in one position.

Fig. 2 is a second perspective showing the apparatus in a second position.

Fig. 3 is a sectional view taken on the line III—III of Fig. 1.

Fig. 4 consists of detailed views, showing a plan and side elevation of the member A.

Referring now to the drawing and to the embodiment shown therein, at C is shown a portion of a camera frame or a base plate which may be attached to a camera frame upon which the mechanism is operated. The plate C is provided with an opening 5 through which light is projected. The shutter is shown at F, which, in the form shown, consists of a rim 6, circular in form. A web 7 extends across a portion of the space within the rim. In the form shown this web is semi-circular. A substantially semi-circular opening 8 is left within the rim. The hub is shown at A, which here constitutes a cam wheel. This hub is connected to the web 7 and through the web to the rim 6. The hub is provided with an opening 10 corresponding to the opening 11 in the plate C, and an axle 12 passes through these openings upon which the shutter rotates.

Members may be provided for spacing the shutter at a convenient distance from the plate, here shown as spacing members 13 and 14. The opposite side of the hub or cam wheel is hollowed out, as shown at 15. The outer periphery of the cam wheel A is provided with a cam groove 20. The portions 21 and 22 of the groove are parallel to the shutter and perpendicular to its axis of rotation. The portion 21, which for convenience will be referred to as the inner portion, is nearer the plate than the portion 22, which will be called the outer portion. The portions 21 and 22 are connected by inclined or cam grooves 23 and 24. The shutter is weighted on the rim 6 to cause a fly-wheel effect. The portion 99 of the rim is weighted to balance the web 7. The plate is provided with a pair of cylindrical slots 30 and 31 through which the feed mechanism operates upon the film, which is shown at 32, to move the same. As is usual, the film is provided with a plurality of holes 33 arranged in rows, one adjacent each edge of the film, the holes in the rows being opposite each other.

The feed mechanism is shown generally at 34 and consists of a frame 35 which is pivoted at 36 to a bracket 37, which is connected to the plate C by any suitable means, such as screws 38. An ear 39 is formed on each end of the bracket by turning up the end, and it is to these ears that the frame 35 is connected in the embodiment shown. The frame 35 is provided with a pair of lateral members 40 and 41, each of which is perforated in three places, the lateral members being connected together by longitudinal members. A rod E passes through the central openings in the lateral members 40 and 41, being rigidly connected to the frame 35 in such openings. The rod E is looped, as shown at 42, to pass over the rim of the shutter and the end 43 of the rod works in a groove 20. As the member A rotates, the end of the rod will be passed through the various portions of the groove 20, so that it will be swung back and forth, carrying with it the frame 35, which will thus swing back and forth upon its pivots for the purpose of causing the feed mechanism to engage and disengage the film through the openings therein.

The feed mechanism proper, shown generally at 50, is mounted in the frame 35. This feed mechanism consists of two hooks 51, the shafts of which work in the openings in the lateral members 40 and 41 of the frame 35, sliding up and down therein as the mechanism is operated. The lower ends of the hooks are connected together by a pressure member 52. A bracket 53 is connected to the bottom of this member about which is connected to rock therein a base 54. A pitman rod D is connected at one end to the base 54 and at the other end to a pin 55 mounted off center in the hub A. As the hub A is rotated, the pitman rod will cause the feed mechanism to reciprocate, moving up and down in the frame. During the downward part of its motion, the frame will be rocked in toward the plate, so that the catches 70 and 71 on the hooks will be in engagement with the film through the openings therein, moving the film downwardly. At the bottom point of the movement, the cam wheel A will through the rod E rock the feed mechanism outwardly, so that the hooks disengage the film, and in this position the pitman rod will move the hooks upwardly to reëngage the film at another place before moving it downwardly again. While the hooks are being moved downwardly with the film, the opening 5 will be closed by the web 7 and when the hooks are being moved upwardly and the film is stationary, the light will project through the opening 8 in the shutter and the opening 5, impinging upon the film and exposing the same.

A hub B is provided for the pitman rod and furnishes a bearing for the pin 55. The weight of the rim 6 acting as a fly-wheel will take care of any irregularities in movements, due to the various reciprocating motions of the parts.

The mechanism is operated through any suitable means. In the form shown I have illustrated, for convenience, a device X, which can be twisted with the fingers to illustrate the operation of the device, though, of course, when employed in a camera, it will be operated by other means, all of which is familiar and well understood.

As will be seen, many of the parts which I employ are made of small rods or wire, which are cheap to make and form into the desired shapes, without the employment of expensive machine operations or expensive labor. The parts are directly or substantially directly coupled. The whole mechanism is condensed into a flat structure which occupies but little space and which can be employed in a camera so condensed that it can be conveniently carried in the pocket.

I have shown this particular form of my invention and the details employed therein for the purpose of describing the invention, and not that I wish to be limited thereto, it being apparent to those skilled in the art that many departures may be made both from the form and the details illustrated, without departing from the spirit of the invention.

I claim:—

1. In a picture taking and exhibiting machine, the combination of a frame, a rotatable shutter mounted in said frame, film feed mechanism in said frame comprising a feed frame and a plurality of hooks, means pivoting said feed frame to said main frame, means controlled by said shutter for rocking said feed frame about said pivots, said hooks being mounted to slide in said frame and means controlled by said shutter for sliding said hooks up and down in said feed frame as said feed frame is rocked about said pivots and means for operating said shutter, said feed frame and said hooks in synchronism.

2. In a picture taking and exhibiting machine, the combination of a main frame, a heavy rotatable shutter in said frame, a hub for said shutter provided with a cam groove, film feed mechanism connected to said frame comprising a feed frame pivoted to the main frame and a plurality of hooks mounted in said feed frame to reciprocate therein, a rod connected to said hooks and to said shutter off the center thereof, whereby said hooks are reciprocated in said feed frame in synchronism with the shutter as the shutter rotates, a device connected to said feed frame and to said cam groove whereby the feed frame is rocked about said pivot when said shutter is rotated and in synchronism with said shutter, and means to rotate said shutter.

3. In a picture taking and exhibiting machine, the combination of a frame, a substantially flat rotatable shutter journaled on said frame, substantially flat film feed mechanism comprising a flat feed frame pivoted to said main frame and a pair of hooks mounted to reciprocate in said frame, said shutter and said feed frame being mounted substantially parallel to each other and interconnecting means whereby said hooks are reciprocated and said feed frame is rocked in synchronism with said shutter when the shutter is rotated and means for rotating the shutter.

4. In a picture taking and exhibiting machine, the combination of a flat frame provided with an opening therein, a rotatable shutter journaled on said frame adapted to open and close said opening as it is rotated, said shutter being provided with a weighted rim and a hub, said hub being provided with a peripheral cam groove, a pair of slots in said frame adjacent said shutter, a flat feed mechanism consisting of a feed frame pivoted to said main frame adjacent said slots, said frame being provided with a pair of lateral members, a rocking member connected to said lateral members near the central portion thereof, said rocking member having its end in the cam groove on the shutter hub, said rocking member being rocked by means of the cam when the shutter is rotated in synchronism with the rotation of the shutter, a pair of hooks in said feed frame, each passing through perforations in the lateral members, one hook being on each side of the feed frame, the catch portions of said hooks adapted to pass in and out in said slots as the hooks are reciprocated up and down in said slots, a rod connected at one end to said hooks and at the other end off center on said hub whereby said hooks are reciprocated in said feed frame as the shutter is operated and in synchronism with said shutter.

5. In a picture taking and exhibiting machine, the combination of a main frame, a film feed mechanism pivoted to said frame, including a frame member and hook means slidably mounted in said frame member, means for rocking said feed mechanism and sliding said hooks in said feed mechanism in synchronism with the rocking of the feed mechanism, including a rotatable member mounted in the main frame provided with a peripheral cam groove, a rod connected to said feed mechanism and having one end in said cam groove whereby the feed mechanism is rocked as the rotatable member is rotated and a rod connected at one end to said hook means and at the other end eccentrically to said rotatable member, whereby the feed mechanism is rocked and the hooks are reciprocated in synchronism with each other as the rotatable member is rotated.

6. In a picture taking and exhibiting machine, the combination of a main frame, film feed mechanism pivoted to said frame, said feed mechanism comprising a feed frame, hook means mounted to reciprocate in said frame adapted to catch the film and feed it as the hook means is reciprocated in the frame, said frame being provided with openings and said hooks being provided with shanks extending through said openings in which openings the hooks slide as they are reciprocated and apparatus for rocking said feed frame mechanism to project said hooks into and out of said openings, and other apparatus adapted to reciprocate said hooks in synchronism.

In witness whereof, I have signed my name hereunto this 16th day of March, 1916.

WALTER PARKES.